United States Patent [19]

Hagita

[11] Patent Number: 5,600,736
[45] Date of Patent: Feb. 4, 1997

[54] IMAGE PATTERN IDENTIFICATION/RECOGNITION METHOD

[75] Inventor: Norihiro Hagita, Atsugi, Japan

[73] Assignee: Nippon Telegraph and Telephone Corporation, Tokyo, Japan

[21] Appl. No.: 588,296

[22] Filed: Jan. 18, 1996

Related U.S. Application Data

[63] Continuation of Ser. No. 352,175, Dec. 1, 1994, abandoned.

[30] Foreign Application Priority Data

Dec. 2, 1993 [JP] Japan .................................. 5-302507
Feb. 17, 1994 [JP] Japan .................................. 6-020682

[51] Int. Cl.$^6$ .................................................. G06K 9/62
[52] U.S. Cl. .......................... 382/209; 382/219; 382/224; 395/2.4
[58] Field of Search .................................. 382/209, 219, 382/224; 340/146.3; 381/43

[56] References Cited

U.S. PATENT DOCUMENTS

| | | | |
|---|---|---|---|
| 3,634,823 | 1/1972 | Dietrich et al. | 340/146.3 |
| 3,688,267 | 8/1972 | Iijima et al. | 340/146.3 |
| 3,906,446 | 9/1975 | Iijima et al. | 340/146.3 |
| 4,153,897 | 5/1979 | Yasuda et al. | 382/30 |
| 4,228,421 | 10/1980 | Asada | 382/30 |
| 4,972,499 | 11/1990 | Kurosawa | 382/30 |
| 4,975,974 | 12/1990 | Nishijima et al. | 382/30 |
| 5,121,444 | 6/1992 | Takizawa et al. | 382/30 |
| 5,163,101 | 11/1992 | Deering | 382/32 |

OTHER PUBLICATIONS

Character Recognition Technique Unhampered By Patterned Paper Or Stains Developed, NTT Review, Sep. 1994, vol. 6, No. 5, p. 2254 XP 000473109.

Norihiro Hagita et al., Robust Recognition Of Degraded Machine–Printed Characters using Complementary Similarity Measure And Error–Correction Learning, Feb. 6–7, 1995, pp. 236–244. SPIE Proceedings vol. 2422.

European Patent Office Search Report, Oct. 31, 1995.

Duda, Richard O., Pattern Classification And Scene Analysis, 1973, p. 32, Section 2.10, p. 42, Problem 14, p. 81, Problem 4, p. 83, Problem 11.

Tookeigaku, Statistics, pp. 133–135, Section 16.1 disclosing a Bernoulli Trial as a typical example of statistical reference.

*Primary Examiner*—Jose L. Couso
*Assistant Examiner*—Anh Hong Do
*Attorney, Agent, or Firm*—Finnegan, Henderson, Farabow, Garrett & Dunner, L.L.P.

[57] ABSTRACT

The present invention provides an image pattern identification/recognition method which enables the reduction of the work load of the user required in the case of incorrect character recognition, as well as facilitating the addition of a new recognition pattern in the dictionary so that the pattern can be identified and added thereafter. A binary image pattern which has been entered is compared to each of the binary mask patterns prepared in advance for each of the recognition categories so as to identify/recognize the binary pattern and to determine the recognition category to which the binary pattern belongs. The binary image pattern is identified as belonging to the first recognition category if the black portions of the binary image pattern are contained in the black portions of the binary mask pattern of the first recognition category and if the black portions of the binary image pattern are contained only in the double black portions between the binary mask pattern of the first recognition category and that of the second recognition category.

5 Claims, 3 Drawing Sheets

IMAGE PATTERN IDENTIFICATION/RECOGNITION METHOD

This application is a continuation of application Ser. No. 08/352,175, filed Dec. 1, 1994, now abandoned.

BACKGROUND OF THE INVENTION

1. Field of the Invention

The present invention relates to a binary (black and white) image pattern identification/recognition method.

2. Related Technologies

In a conventional character recognition processor and an image recognition processor including a kanji (Chinese-character-reading) OCR (Optical Character Reader), some distinctive features of Chinese characters and other symbols are selected from characters and image patterns in the form of vectors to be compared to reference pattern vectors in each of the categories in a standard dictionary created in advance so as to be able to perform discriminant functions such as those detecting similarity or distance, thus identifying the most similar character or image pattern as a result.

Conventional character recognition systems widely use the so-called "structural feature" which corresponds to character line structures such as line direction, connection relationship, and positional definition. However, in the case of specially designed characters having an unusual texture, unclear characters, or images which cause significant background noise, the "structural feature" is significantly distorted, which significantly degrades the accuracy of recognition.

Moreover, simple degree of similarity (hereafter, referred to as "similarity degree") is also known as a discriminant function based on the number of black pixels common to a binary image entered and the reference pattern vectors (also represented in a binary pattern) of each category in the standard dictionary prepared in advance. However, this method has a problem in that specially designed characters having an unusual texture or images having significant background noise may be incorrectly identified as a category having more (or a larger number of) black pixels among the reference pattern vectors.

That is, the conventional OCR technology or other recognition technologies are not free from the problem that specially designed characters, unclear characters, characters having significant background noise or reverse contrast characters (white characters against a black background) cannot be recognized correctly.

SUMMARY OF THE INVENTION

The object of the present invention is to provide an image pattern identification/recognition method capable of processing specially designed characters, unclear characters, significantly-modified characters, or a character string containing reverse contrast characters.

An aspect of the present invention provides a method as follows. If black portions of a binary image pattern which has been entered correspond to some of the black portions contained in a binary mask pattern of recognition category A, and if the black portions of the input binary image pattern do not correspond to those contained both in the recognition category A and another recognition category B, the input binary pattern is identified as belonging to the recognition category A.

In the case when no recognition category is found in such a procedure, it is also possible to reject the input binary image pattern if the black portions of the input binary image pattern correspond only to those contained both in the binary mask patterns of category A and category B.

According to the above-mentioned procedure, by comparing the input binary image pattern with corresponding binary mask patterns of each of the recognition categories created in advance, it is possible to effectively identify/recognize the input binary image pattern as belonging to a particular recognition category, or reject the input binary image pattern.

Another aspect of the present invention is the process of comparing the input image pattern with the binary mask patterns stored in the standard dictionary for identification or rejection. The OCR user can visually reexamine the rejected patterns for correction and need not reexamine those images which have been successfully identified. This produces a great advantage in reducing the work load of the user.

Moreover, in the conventional character recognition method, an element of distinctive features is mostly stored in depth n (n>1), whereas each element of the binary mask pattern according to the present invention can be represented by one bit. That is, the memory capacity can be reduced to 1/n. Furthermore, by incorporating the known image coding method, the binary mask pattern memory capacity can be further reduced, which enhances processing efficiency and enables the preparation of a dictionary requiring less memory.

Still another advantage of the present invention is to provide a simplified processing of feature selection because there is no need to select a feature "amount" concerning a character line structures such as direction or connection relationship. The recognition efficiency is hardly affected by modification of character structure caused by an unclear or degraded character or a character containing background noise. Even when using binary mask patterns created from image patterns each constructed by black portions (pixels) in contrast to white portions (pixels) as a background, it is possible to distinguish with high accuracy so-called "reverse contrast characters" which are unclear, distorted, or contain background noise.

The above-described invention uses the black portions for corresponding with the binary mask patterns. However, it is also possible to use the white portions for correspondence with the binary mask patterns.

In this case, the same functions and effects can be obtained as in the above-mentioned method of the present invention.

There is still another way to implement the present invention. A first match degree is determined according to the number of black pixels common to the input binary image pattern and the binary mask pattern, whereas a second match degree is determined according to the white pixels common to the input binary image pattern and the binary mask pattern. Subsequently, a first mismatch degree is determined according to the number of different color combinations: white pixels in the binary image pattern and black pixels in the binary mask pattern, whereas a second mismatch degree is determined according to the number of different color combinations: black pixels in the binary image pattern and white pixels on the binary mask pattern. Then, the first match degree and the second match degree are used to obtain a third match degree, whereas a first mismatch degree and a second mismatch degree are used to obtain a third mismatch degree. Next, the third match degree and the third mismatch degree are used to obtain the similarity between the binary image pattern and the binary mask pattern so as to determine that the binary image pattern belongs to the recognition category where the similarity is at its maximum.

The above-described procedure may be modified in such a manner that a predetermined number of positions are selected within a single pattern without using the rest of the positions in the pattern, and match and mismatch degrees are determined according to the selected positions.

As has thus far been described, the present invention does not require the "structural feature" concerning the character structure such as a line direction or connection relationships. Consequently, the processing of distinctive feature selection is simplified and character recognition is hardly affected by modification of the character structure. Correct recognition can be obtained even of unclear, degraded characters or characters having background noise, as well as of so-called "reverse contrast characters" which may be unclear, degraded, or have background noise, even by using binary mask patterns consisting of black pixels for characters and white pixels for the background.

Moreover, it is also possible to apply a predetermined threshold value for each of the binary mask patterns of the recognition category. The above-mentioned similarity degree is obtained between the binary image pattern and each of the binary mask patterns. If the above-mentioned similarity degree obtained for a single recognition category exceeds the threshold value of the binary mask pattern, the binary image pattern is identified as belonging to that recognition category.

This type of procedure using the threshold value may be constructed so that the binary image pattern is rejected if the binary image pattern does not belong to any of the recognition categories, and if the above-mentioned similarity degrees between the binary image pattern and more than one recognition category exceeds the threshold values of the corresponding mask patterns.

According to the present invention, it is not necessary to determine the "structural feature" concerning the character structure such as a line direction and connection relationship. Consequently, the process of selecting the distinctive features is significantly simplified and brings about an advantage in that even modified character structures which are unclear, degraded, contain background noise, or reverse contrast characters can be recognized with high accuracy.

In the above-mentioned invention, it is also possible to create and add a brand new binary mask pattern or to update the currently-used binary mask pattern by repeated learning with a predetermined similarity based on data on the input image patterns.

DETAILED DESCRIPTION OF THE INVENTION

Description will now be directed to an embodiment of the present invention with reference to the drawings.

Figure 1:
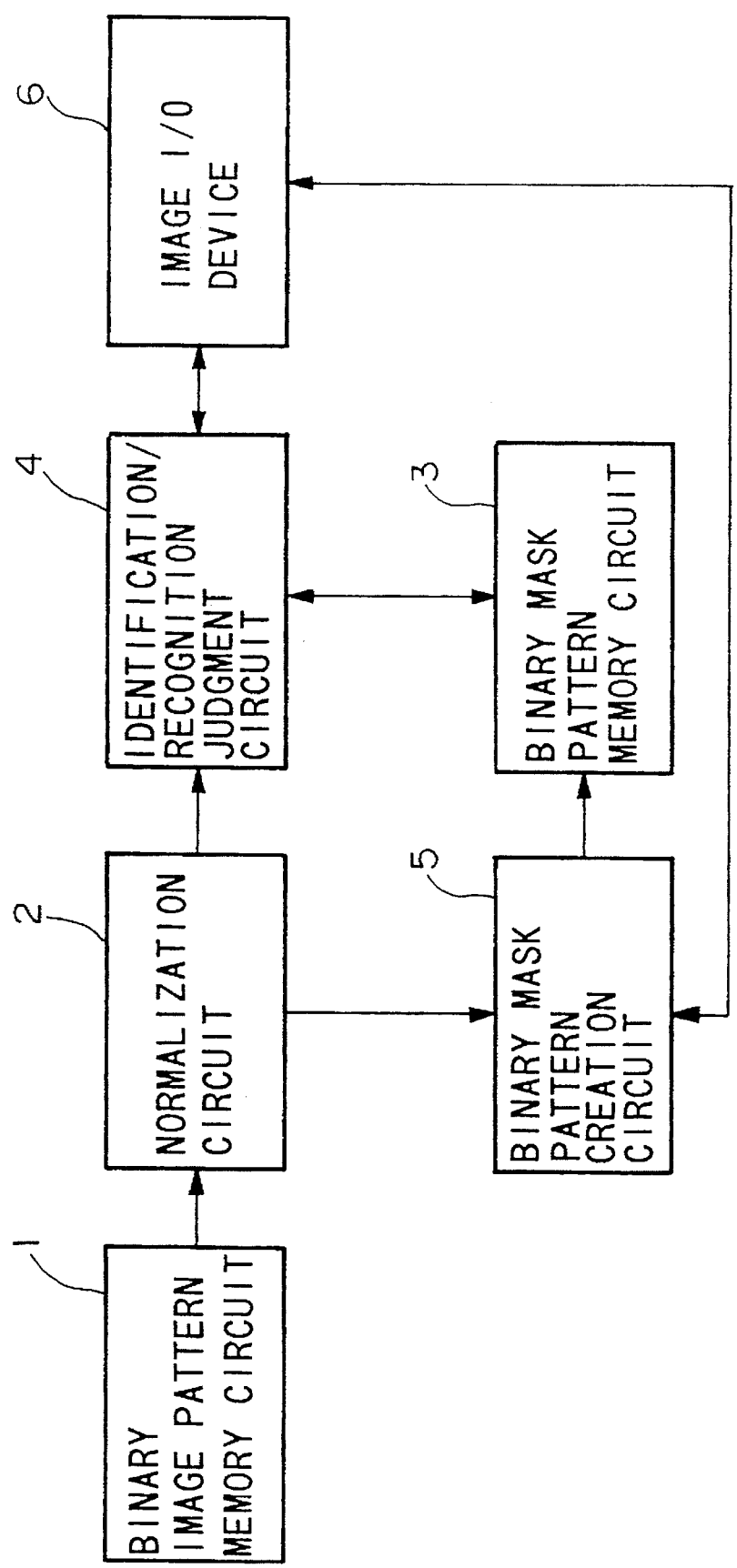
FIG. 1 is a block diagram illustrative of an exemplary configuration of devices for implementing the image pattern identification and recognition method according to the present invention.

FIG. 1 is a block diagram, showing the configuration of the image pattern identification/recognition method according to the present invention implemented as an apparatus, which comprises a binary image pattern memory circuit 1, a normalization circuit 2, a binary mask pattern memory circuit 3, an identification/recognition judgment circuit 4, a binary mask pattern creation circuit 5, and an image I/O device 6.

The binary image pattern memory circuit 1 stores binary image patterns of the characters or images to be identified or recognized. Each of the binary image patterns consists of n pixels: for example, "0" for white pixels and "1" for black pixels.

The normalization circuit 2 is provided with a binary image pattern consisting of n pixels taken from the binary image pattern memory circuit 1. For example, the position and the size are normalized by using the centroid and the secondary moment, which is known to those skilled in the art.

The binary mask pattern memory circuit 3 stores a single or multiple (normally, multiple) binary mask patterns for each category to be used for identification and recognition judgment of the image pattern entered.

The identification/recognition judgment circuit 4 is supplied with a binary image pattern of n pixels from the normalization circuit 2 so as to be compared to the binary mask pattern of each category of the binary mask pattern memory circuit 3. For example, if the black (or white) portions of the input image pattern are contained in the black (or white) portions of the binary mask pattern of a particular category, the input image pattern is recognized/identified as belonging to that particular category, unless the black (white) portions correspond to those commonly contained in the binary mask pattern and another or other binary mask pattern(s) of different categories. If the black (white) portions of the input image pattern correspond only to the common portions, the input image pattern is rejected. Otherwise, the data on the white or black portions of the input image pattern is used to judge whether to recognize or reject by using a discriminant function such as similarity or a discriminant function which recognizes reverse contrast characters with high accuracy, and the results are output.

The binary mask pattern creation circuit 5 is supplied with image data produced from the image I/O device 6 and with normalized binary image patterns added/updated or created as a new category from the normalization circuit 2 so as to create a binary mask pattern. The binary mask pattern which has been created in the binary mask pattern creation circuit 5 is loaded on the binary mask pattern memory circuit 3, or added to the binary mask pattern memory circuit 3 so as to update its content.

The image I/O device 6 is supplied with data on a character or image category number, a discriminant function value, and the result of classification of the binary image patterns and the like so as to display these data items. Moreover, the image I/O device 6 is also supplied with image data through a keyboard operation or a mouse operation. Furthermore, the image I/O device 6 supplies the binary mask pattern creation circuit 5 with data required for creating a new binary mask pattern or updating a currently used binary mask pattern.

Description will now be ,directed to explanation of the identification/recognition procedure of input image patterns with reference to FIG. 1.

A binary image pattern corresponding to a character to be identified/recognized is read out from the binary image pattern memory circuit 1. The normalization circuit 2 normalizes the position and size for the binary image pattern and supplies the obtained data to the identification/recognition judgment circuit 4.

Hereinafter, it is assumed that the binary image pattern which has been normalized will be referred to as a normalized character pattern X. The normalized character pattern X can be expressed as a vector having n elements: $X=(x_1, x_2, \ldots x_i, \ldots x_n)$. An element $x_i$ represents a pixel value (for example, a white point if $x_i$="0" and a black point if $x_i$="1") of the image position i (=1, 2 ... n).

The identification/recognition judgment circuit 4 compares the normalized character pattern X to the k-th (k=1, 2 ... $k_j$) binary mask pattern of the j-th character category (j=1, 2, ... J), i.e., $M_{jk}$. As the $M_{jk}=(m_1, m_2, \ldots m_i, \ldots, m_n)_{jk}$, $m_i$ is binary. That is, a white point is represented by $m_i$="0", and a black point, by $m_i$="1".

Figure 2:
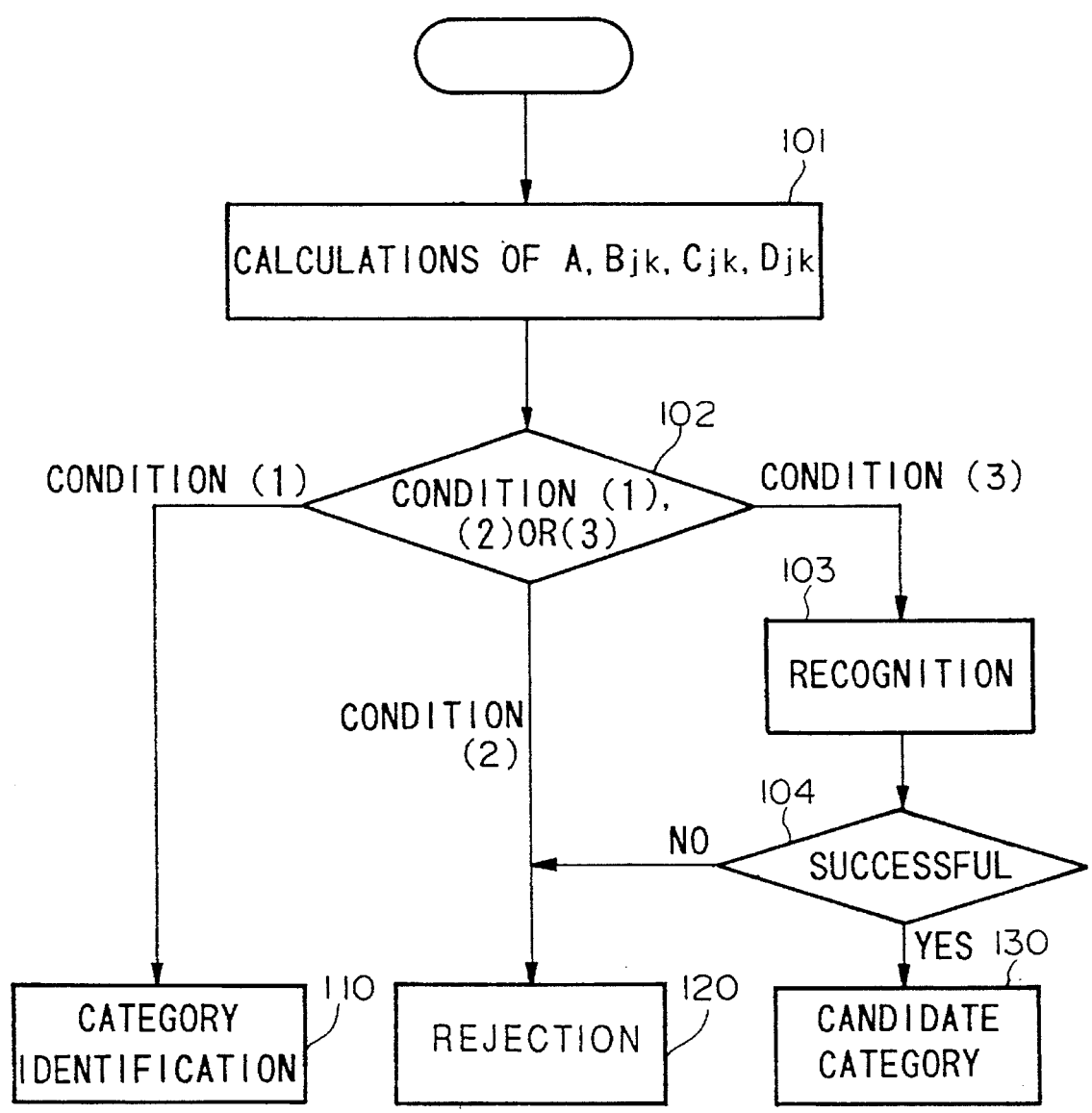
FIG. 2 is an example flowchart for carrying out judgment required for the identification, rejection, and recognition according to the present invention.

An example of a comparison between the normalized character pattern X and the binary mask pattern $M_{jk}$ will be explained below with reference to FIG. 2 which illustrates an example of a flowchart of the processing.

First of all, the following calculations are carried out between the element $x_i$ of the normalized character pattern X and the element $m_i$ of the binary mask pattern $M_{jk}$. (Step 101)
(1) The total number A when $x_i$="1"
(2) The total number $B_{jk}$ when $m_i$="1"
(3) The total number $C_{jk}$ when $x_i$="1" and $m_i$="1"
(4) The total number $D_{jk}$ when $x_i$="1" and $m_i$="0"

Subsequently, a judgment is made to determine whether the state is "identification", "rejection", or "recognition", according to the following conditions (1) through (3) (step 102).

Condition (1): If there is only one character category j which satisfies $C_{jk} \leq B_{jk}$, and $A=C_{jk}$, the input characters are judged to be of category j (step 110).

Condition (2): If there are more than two of character category j which satisfies $C_{jk} \leq B_{jk}$, and $A=C_{jk}$, the input character is judged to be rejected. (step 120)

Condition (3): If no character category satisfies the condition (1) or (2), a recognition processing (step 103) is carried out between the normalized character pattern X and the binary mask pattern $M_{jk}$ by using known discriminant functions or those for recognizing a character having an extremely noisy background or a reverse contrast character having a black background, so as to determine whether to recognize or reject the character (step 104). If the judgment is made to be "recognition", the character category is made to be a candidate category (step 130).

An embodiment of the recognition processing (step 103) under the condition (3) will be explained below, using a similarity degree $S_H(X, M_{jk})$ according to the present invention. That is, for the total number of black pixels A of the normalized character pattern X, the similarity degree $S_H(X, M_{jk})$ is calculated as follows.

$$S_H(X, M_{jk}) = \frac{C_{jk}(n - B_{jk}) - B_{jk}D_{jk}}{\sqrt{A(n-A) B_{jk}(n - B_{jk})}}$$

As a result of the recognition judgment, the character category j having the maximum similarity is output as the character category which has been recognized as the first one among the others.

In this case, the processing of distinctive feature selection is significantly simplified because the similarity degree $S_H(X, M_{jk})$ does not require the "structural feature" concerning the character line structure such as a line direction and connection relationship. Moreover, the recognition efficiency is hardly affected at all by the modification of the character line structure caused by unclearness or extreme noise.

It should be noted that the recognition processing in the condition (3) may use an absolute value $|S_H(X, M_{jk})|$ of the above-mentioned similarity degree $S_H(X, M_{jk})$, as the discriminant function.

Figure 3:
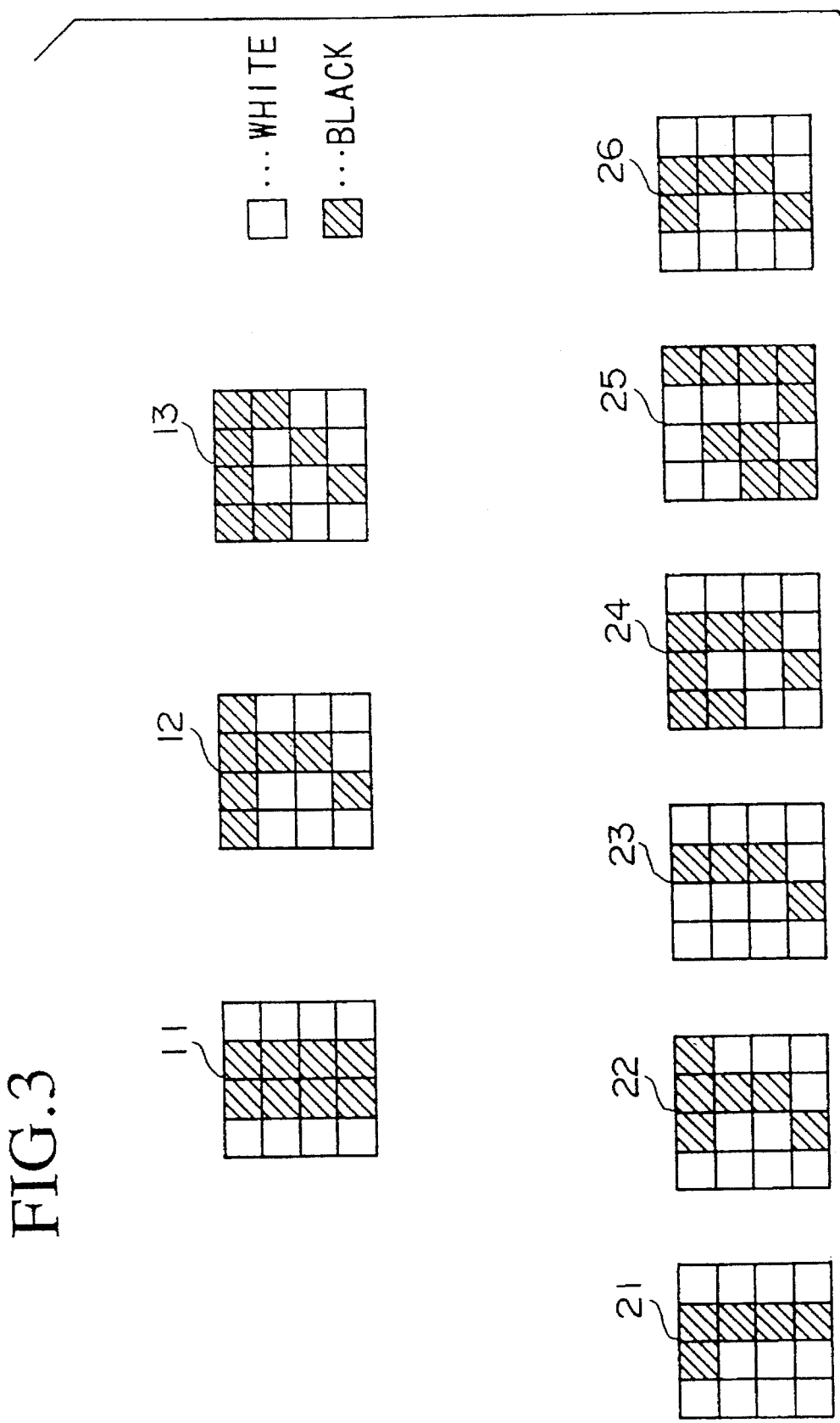
FIG. 3 offers some pattern examples for explanation of the judgment processing of identification, rejection, and recognition.

Description will now be directed to the processings required for "identification", "recognition", and "rejection", with reference to FIG. 3.

FIG. 3 illustrates examples of the binary mask patterns $M_{jk}$ and the normalized character pattern X, each consisting of n=16 (pixels), two character categories (j=1, 2), and $K_1=1$, $K_2=2$. The pattern 11 is a binary mask pattern $M_{11}$ (first binary mask pattern of the first character category), wherein the total number of $m_i$="1" is $B_{11}=8$. The pattern 12 is a binary mask pattern $M_{21}$ (first binary mask pattern of the second character category), wherein the total number of $m_i$="1" is $B_{21}=7$. The pattern 13 is a binary mask pattern $M_{22}$ (second binary mask pattern of the second character category), wherein the total number of $m_i$="1" is $B_{22}=8$. Patterns 21 through 26 are all examples of the normalized character pattern X.

Incidentally, the pattern 25 is a reversed one (reverse contrast character) corresponding to the pattern 24.

First of all, explanation will be given on comparison of the normalized character pattern 21 to each of the binary mask patterns 11 through 13 of the binary mask pattern $M_{jk}$. The total number of pixels $x_i$="1" and $m_i$="1" when the total A=5 for $x_i$="1" is: $C_{11}=5$, $C_{21}=4$, and $C_{22}=3$. Only the binary mask pattern $M_{11}$ of the binary mask pattern 11 satisfies the condition (1). Consequently, the normalized character pattern X of the normalized character pattern 21 is identified as the first character category.

In the case of the normalized character pattern 22 of the normalized character pattern X, the total number for A=6 when $x_i$="1" and $m_i$="1" is: $C_{11}=5$, $C_{21}=6$, and $C_{22}=5$. Only the binary mask pattern $M_{21}$ satisfies the condition (1). Therefore, the normalized character pattern X of the normalized character pattern 22 is identified as the second character category.

In the case of the normalized character pattern 23 of the normalized character pattern X, the total number for A=4 when $x_i$="1" and $m_i$="1" is: $C_{11}=4$, $C_{21}=4$, and $C_{22}=3$. Both the binary mask pattern 11 ($M_{11}$) and 12 ($M_{21}$) satisfy the condition (2). Therefore, the normalized character pattern X of the normalized character pattern 23 is rejected.

In the case of the normalized character pattern 24 of the normalized character pattern X, the total number for A=7 when $x_i$="1" and $m_i$="1" is: $C_{11}=5$, $C_{21}=6$, $C_{22}=6$. That is, none of the binary mask patterns 11 through 13 satisfies the condition (1) or (2). Therefore, the discriminant function of the condition (3) is carried out.

In this case, the similarity degrees $S_H$ between the normalized character pattern 24 of the normalized character pattern X and each of the binary mask patterns $M_{jk}$ of 11 through 13 are calculated as follows:

$$S_H(X, M_{11}) = \frac{5 \cdot (16-8) - 8 \cdot 2}{\sqrt{7 \cdot (16-7) \cdot 8 \cdot (16-8)}} = \frac{24}{24\sqrt{7}} = 0.378$$

$$S_H(X, M_{21}) = \frac{6 \cdot (16-7) - 7 \cdot 1}{\sqrt{7 \cdot (16-7) \cdot 7 \cdot (16-7)}} = \frac{47}{63} = 0.746$$

$$S_H(M, M_{22}) = \frac{6 \cdot (16-8) - 8 \cdot 1}{\sqrt{7 \cdot (16-7) \cdot 8 \cdot (16-8)}} = \frac{40}{24\sqrt{7}} = 0.630$$

The calculation results show that the highest similarity is obtained by the binary mask pattern $M_{21}$ of the binary mask pattern 12. That is, the second character category is determined to be of the first recognition.

In the case of the normalized pattern 25 which is the reversed pattern (reverse contrast character) of the pattern 24, the total number for A=9 when $x_i=$"1" and $m_i=$"1" is: $C_{11}=3$, $C_{21}=1$, and $C_{22}=2$. That is, none of the binary mask patterns 11 through 13 of the binary mask pattern $M_{jk}$ satisfies the condition (1) or (2). Therefore, the discriminant function of the condition (3) is carried out.

Here, instead of the above-mentioned similarity degree $S_H(X, M_{jk})$, its absolute value $|S_H(X, M_{jk})|$ can be used as the discriminant function. In this case, the similarity degrees $|S_H|$ between the normalized character pattern 25 of the normalized character pattern X and each of the binary pattern $M_{jk}$ of patterns 11 through 13 are calculated as follows.

$$|S_H(X, M_{11})| = \left| \frac{3 \cdot 8 - 8 \cdot 6}{\sqrt{7 \cdot 9 \cdot 8 \cdot 8}} \right| = 0.378$$

$$|S_H(X, M_{21})| = \left| \frac{1 \cdot 9 - 7 \cdot 8}{\sqrt{7 \cdot 9 \cdot 7 \cdot 9}} \right| = 0.746$$

$$|S_H(X, M_{22})| = \left| \frac{2 \cdot 8 - 8 \cdot 7}{\sqrt{7 \cdot 9 \cdot 8 \cdot 8}} \right| = 0.63$$

Thus, the highest similarity is obtained by the binary mask pattern $M_{21}$ of the pattern 12. Similarly, the second character category is determined to be of the first recognition for the normalized character pattern 25 which is a black-white reversed pattern of the pattern 24.

Description will now be directed to a second embodiment of the recognition processing (step 103) of the above-mentioned condition (3). In this embodiment, another novel similarity degree $S_c(X, M_{jk})$ according to the present invention is used as the discriminant function in the recognition processing of the condition (3).

$$S_c(X, M_{jk}) = \frac{nC_{jk} - AB_{jk}}{\sqrt{B_{jk}(n - B_{jk})}}$$

The numerator "$nC_{jk} - AB_{jk}$" of the above-described fractional expression of the similarity degree $S_c(X, M_{jk})$ is calculated as follows for the image pattern X and the binary mask pattern.

$$C_{jk}(n-B_{jk}-D_{jk})-(B_{jk}-C_{jk})\cdot D_{jk}=n\cdot C_{jk}-A\cdot B_{jk},$$

wherein $C_{jk}$ represents a total number when $x_i=$"1" and $m_i=$"1";
$(n-B_{jk}-D_{jk})$, a total number when $x_i=$"0" and $m_i=$"0";
$(B_{jk}-C_{jk})$, a total number when $x_i=$"0" and $m_i=$"1"; and
$D_{jk}$, a total number when $x_i=$"1" and $m_i=$"0".

Thus, the similarity degrees $S_c$ between the normalized character pattern X of the pattern 24 in FIG. 3 and the binary mask pattern $M_{jk}$ of each of the binary mask patterns 11 through 13 are calculated as follows.

$$S_c(X, M_{11}) = \frac{16 \cdot 5 - 8 \cdot 7}{\sqrt{(16-8)\cdot 8}} = \frac{24}{8} = 3$$

$$S_c(X, M_{21}) = \frac{16 \cdot 6 - 7 \cdot 7}{\sqrt{(16-7)\cdot 7}} = \frac{47}{3\sqrt{7}} = 5.92$$

$$S_c(X, M_{22}) = \frac{16 \cdot 6 - 8 \cdot 7}{\sqrt{(16-8)\cdot 8}} = \frac{40}{8} = 5$$

In the same way as when the similarity degree $S_H(X, M_{jk})$ is used, the highest similarity degree is obtained by the binary mask pattern $M_{21}$ of the pattern 12 and the second character category is determined to be of the first recognition.

If the absolute value $|S_c(X, M_{jk})|$ of the similarity degree $S_c(X, M_{jk})$ is used as the discriminant function in carrying out the discriminant function of the condition (3) in the case of the normalized character pattern X of the pattern 25 which is a black-white reversed (reverse contrast) pattern of the pattern 24, then the similarity degrees $|S_c|$ between the normalized character pattern 25 and each of the binary mask patterns 11 through 13 are calculated as follows.

$$|S_c(X, M_{11})| = \left| \frac{16 \cdot 3 - 8 \cdot 9}{\sqrt{(16-8)\cdot 8}} \right| = 3$$

$$|S_c(X, M_{21})| = \left| \frac{16 \cdot 1 - 7 \cdot 9}{\sqrt{(16-7)\cdot 7}} \right| = 5.92$$

$$|S_c(X, M_{22})| = \left| \frac{16 \cdot 2 - 8 \cdot 9}{\sqrt{(16-8)\cdot 8}} \right| = 5$$

Thus, the highest similarity degree is obtained by the binary mask pattern $M_{21}$ of the binary mask pattern 12. In the same way as the normalized character pattern 24, the second character category is determined to be of the first recognition for the normalized character pattern 25.

Description will now be directed to another method for identification and rejecting judgment. This method uses the above-described novel similarity degree $S_c(X, M_{jk})$ as the discriminant function in the judgment of the above-mentioned conditions (1) through (3).

The above-mentioned conditions (1) through (3) correspond to the conditions (1a) through (3a), respectively, which will be used in the explanation below.

In this identification/recognition judgment processing, the above-described A, $B_{jk}$, and $C_{jk}$ are calculated between the elements $x_i$ of the normalized character pattern X and the corresponding element $m_i$ of the binary mask pattern $M_{jk}$ (see step 101) to determine the similarity degree $S_c(X, M_{jk})$. By using the identification threshold value $t_{jk}$ of each binary mask pattern stored in the binary mask pattern memory circuit 3, the processing of the following conditions (1a) through (3a) are carried out one after another (see step 102).

The identification threshold value $t_{jk}$ setting method for the binary mask pattern will be detailed later.

Condition (1a): If $S_c(X, M_{jk}) \geq t_{jk}$ is satisfied by one category j alone, then judgment is made that the input character is identified successfully as the category j (see step 110).

Condition (2a): If $S_c(X, M_{jk}) \geq t_{jk}$ is satisfied by two or more than two categories, then judgment is made that the input character is to be rejected (see step 120).

Condition (3a): If no character category satisfies condition (1a) or (1b), then recognition processing is carried out by using the similarity degree Sc as the discriminant function between the normalized character pattern X and the binary mask pattern $M_{jk}$ (see step 103). In the case when there is any character category j which satisfies the similarity degree $S_c(X, M_{jk}) \geq u_{jk}$, the character category of the binary mask pattern $M_{jk}$ having the highest similarity degree is output as the first recognition result (see step 130).

On the contrary, if no character category j is found to satisfy the similarity degree $S_c(X, M_{jk}) \geq u_{jk}$, i.e., if the similarity degree $S_c(X, M_{jk})$ is smaller than $u_{jk}$ for all the binary mask patterns $M_{jk}$, then judgment is made to reject the data (see step 120).

Incidentally, the variable $u_{jk}$ represents a threshold value predetermined for making judgments for rejecting each of the binary mask patterns $M_{jk}$. The variable $u_{jk}$ is set to be smaller than the identification threshold value $t_{jk}$ ($u_{jk} < t_{jk}$).

Explanation will now be given on the processing required for identification and rejection judgment with reference to FIG. 3. First of all, a comparison is made between the normalized character pattern X of pattern 22 and the binary mask pattern $M_{jk}$ of each of the binary mask patterns 11 through 13. The similarity degrees $S_c$ between the normalized character pattern 22 and each of the binary mask patterns 11 through 13 are calculated as follows.

$$S_c(X, M_{11}) = \frac{16 \cdot 5 - 8 \cdot 6}{\sqrt{(16-8) \cdot 8}} = \frac{32}{8} = 4 < t_{11} = 4.5$$

$$S_c(X, M_{21}) = \frac{16 \cdot 6 - 7 \cdot 6}{\sqrt{(16-7) \cdot 7}} = \frac{54}{3\sqrt{7}} = 6.8 > t_{21} = 5.6$$

$$S_c(X, M_{22}) = \frac{16 \cdot 5 - 8 \cdot 6}{\sqrt{(16-8) \cdot 8}} = \frac{32}{8} = 4 < t_{22} = 5.9$$

Thus, the binary mask pattern $M_{21}$ alone satisfies the condition (1a). Consequently, the normalized character pattern X of pattern 22 is identified as the second character category.

In the case of the normalized character pattern 26, the similarity degrees $S_c$ against each of the binary mask patterns 11 through 13 are calculated as follows.

$$S_c(X, M_{11}) = \frac{16 \cdot 5 - 8 \cdot 5}{\sqrt{(16-8) \cdot 8}} = \frac{40}{8} = 5 > t_{11} = 4.5$$

$$S_c(X, M_{21}) = \frac{16 \cdot 5 - 7 \cdot 5}{\sqrt{(16-7) \cdot 7}} = 5.67 > t_{21} = 5.6$$

$$S_c(X, M_{22}) = \frac{16 \cdot 4 - 8 \cdot 5}{\sqrt{(16-8) \cdot 8}} = 3 < t_{22} = 5.9$$

Thus, both of the binary mask pattern $M_{11}$ of the pattern 11 and the binary mask pattern $M_{21}$ of pattern 12 satisfy the condition (2a). Consequently, the normalized character pattern X of pattern 26 is rejected.

In the case of the normalized character pattern 23, the similarity degrees $S_c$ in respect to each of the binary mask patterns 11 through 13 are as follows:

$$S_c(X, M_{11}) = \frac{16 \cdot 4 - 8 \cdot 4}{\sqrt{(16-8) \cdot 8}} = \frac{32}{8} = 4 < t_{11} = 4.5$$

$$S_c(X, M_{21}) = \frac{16 \cdot 4 - 7 \cdot 4}{\sqrt{(16-7) \cdot 7}} = 4.54 < t_{21} = 5.6$$

$$S_c(X, M_{22}) = \frac{16 \cdot 3 - 8 \cdot 4}{\sqrt{(16-8) \cdot 8}} = 2 < t_{22} = 5.9$$

Thus, none of the binary mask patterns 11 through 13 satisfies the condition (1a) or (2a). Consequently, the discriminant function of the similarity degree $S_c$ for the condition (3a) is carried out. Under the condition (3a), the binary mask pattern $M_{21}$ of the pattern 12 has the highest similarity. Therefore, the secondary character category has the first recognition.

Incidentally, the above-described identification/recognition processing is not limited to the above-mentioned procedure. For example, it is also possible to use a combination of the above-described embodiments.

Some examples will now be given on the processing as to how to create a novel binary mask pattern based on a character which has been incorrectly recognized or which has not been learned, and further to add the obtained data, updating the contents of the binary mask pattern memory circuit 3.

Embodiment 1 of updating the binary mask pattern memory circuit 3 by adding new data This is an example to create a binary mask pattern based on data on the black or white portions of an input image pattern through repeated learning by using a known similarity degree S expressed as follows as a discriminant function.

$$S(X, M_{jk}) = \frac{C_{jk}}{\sqrt{A \cdot B_{jk}}}$$

Firstly, the image I/O device 6 supplies the binary mask pattern creation circuit 5 with data on the character category (assumed to be j-th category) to be added/updated or created (an example of addition will be given here). For the input image to be added, the binary mask pattern creation circuit 5 creates a novel binary mask pattern $M_{j(k+1)}$ corresponding to the N input image patterns (normalized character patterns) $X_1, X_2, \ldots X_N$ which are obtained from the normalization processing circuit 2 and which belong to the j-th character category to be learned. The creation processing consists of the following steps.
(Step 1)
A total $A_T$ of the number A when $x_i$="1" is calculated for each of the N input image pattern $X_1, X_2, \ldots X_N$; and a total $A_l$ of the input image pattern X when the $x_i$="1" at each of the 16 pixel positions.

$A_l$ is represented as a string of $A'_1, A'_2, \ldots A'_l, \ldots A'_n$ in a descending order. Then, for a predetermined threshold value "a" (0<a<1), L is obtained to satisfy the following relationship.

$$\frac{\sum_{l=1}^{L} A'_l}{A_T} < a < \frac{\sum_{l=1}^{L+1} A'_l}{A_T}$$

It should be noted that if N is too small, for example, if N=1, "a" is assumed to be 1.
(Step 2)
The binary mask pattern $M_{j(k+1)}$ is set to $m_i$="1" for the pixel position i corresponding to each of the string l=1, 2, . . . L whereas $m_i$=0 is set for the other pixel positions i.
(Step 3)
The similarity S $(X_t, M_{j(k+1)})$ is calculated between each image $X_t$ of the N input image patterns $X_1, X_2, \ldots X_N$ and the binary mask pattern $M_{j(k+1)}$ created in step 2. The image $X_t$ which has the maximum similarity degree is found and the novel binary mask pattern $M_{j(k+1)}$ is replaced by the image $X_t$.
(Step 4)
The similarity degree S is calculated and recognized between each image $X_1$ of the N input images $X_1, X_2, \ldots X_N$ and each of the binary mask patterns $M_{jk}$ stored in the binary mask pattern memory circuit 3 as well as the binary mask pattern $M_{j(k+1)}$ created in step 3.

If all of the N images are recognized as the j-th character category, control is passed to step 6. Otherwise, control is passed to step 5.
(Step 5)
For the M (<N) images which have been correctly recognized as the j-th character category, the binary mask pattern $M_{j(k+1)}$ is created in the same way as step 1 and step 2, and is stored in the binary mask pattern memory circuit 2.

For the rest of the images (N−M), control is passed to step 1, assuming k=k+1 and N=N−M.
(Step 6)
A binary mask pattern $M_{j(k+1)}$ is created in the same way as in step 1 and step 2, and is stored in the binary mask pattern memory circuit 3, terminating the processing.

Embodiment 2 of updating the binary mask pattern memory circuit 3 by adding new data This is an example to create a novel binary mask pattern and an identification threshold value for each character category based on data on the black or white portions of an input image pattern (sample pattern) through repeated learning by using the similarity degree $S_H$.

Firstly, the image I/O device 6 supplies the binary mask pattern creation circuit 5 with data on the character category (assumed to be j-th category) to be created. For the input image, the binary mask pattern creation circuit 5 creates $K_j$ binary mask patterns: $M_{j1}$, $M_{j2}$, ..., $M_{jk}$, ..., $M_{jKj}$ corresponding to each of the novel character categories to be created: j=1, 2, ... J. The creation processing consists of the following steps.

(Step 1a)

$K_j$=1 is assumed to be the number of the binary mask patterns of the j-th character category to be created.

Calculations are carried out to determine the number $A_T$ when $x_i$="1" for the $N_j$ input image patterns (normalized character patterns) belonging to the j-th character category $X_1$, $X_2$, ... $X_N$ as well as to determine a total $A_i$ of the input image pattern X when the $x_i$="1" at each of the 16 pixel positions. Subsequently, a binary mask pattern $M_{j1}$ is created by comparing the ratio $A_i/N_j$ for the number of $x_i$="1" at the pixel position i to the ratio $A_T/(nN_j)$ of $x_i$="1" of all the pixels as follows.

If $A_i/H_j \geq A_T/(nN_j)$,

Then, $M_{j1}$ element is set to $m_i$="1".

Otherwise, $M_{j1}$ element is set to $m_i$="0".

For the input image patterns (normalized character patterns) $X_1$, $X_2$, ..., $X_{Nj}$, a label j1 is assigned as the pattern used in creation of the binary mask pattern $M_{j1}$.

The above-described processing is executed for all the character categories to be created.

(Step 2a)

The similarity degree $S_H(X_t, M_{jk})$ is calculated between all of the input image patterns $X_t$ to be created and all of the binary mask patterns $M_{jk}$ over all character categories so as to find the $M_{lh}$ having the maximum similarity degree. It is assumed that the label jk has been assigned to the input image pattern $X_t$.

If l=j, a judgment is made that $X_t$ has been correctly recognized as the j-th character category. Otherwise, a judgment is made that $X_t$ has been incorrectly recognized and a new label je is assigned.

Upon completion of this processing, control is passed to step 4a unless any of the $X_t$ patterns has been incorrectly recognized. Otherwise, control is passed to step 3a.

(Step 3a)

h=1 is assumed for a new j-th character category to be created.

If the label jk is assigned for one or more than one input image pattern, a novel binary mask pattern $M_{jh}$ is created, assuming h=h+1.

This judgment processing is carried out for each of the $K_j$ labels of the j-th character category.

Subsequently, if the label je is assigned for one or more than one input image pattern, binary mask patterns $M_{je}$ are temporarily created for these input image patterns $X_t$ in the same way as step 1a. The similarity degree $S_H(X_t, M_{je})$ is calculated between each of the $X_t$ and the corresponding $M_{je}$ so as to find the input image pattern $X_s$ having the maximum similarity degree and assign the $x_s$ as a novel binary mask pattern $M_{jh}$, assuming h=h+1.

$K_j$=h is assumed to be the number of the novel binary mask patterns for the j-th character category.

This processing is repeated for all the novel character categories to be created and the novel binary mask patterns are stored in the binary mask pattern memory circuit 3. Control is returned to step 2a.

(Step 4a)

The similarity degree $S_H(X_t, M_{jk})$ is calculated between each of the binary mask patterns $M_{jk}$ and each of the input image patterns $X_t$, excluding the j-th character category so as to find the maximum similarity degree $t_{jk}$ for each of the binary mask patterns $M_{jk}$. The maximum similarity degree is assigned as the identification threshold value $t_{jk}$ of the binary mask pattern $M_{jk}$ and is stored in the binary mask pattern memory circuit 3. This processing is carried out for all of the binary mask patterns.

Embodiment 3 of updating the binary mask pattern memory circuit 3 by adding new data This shows an example to update the binary mask pattern and the identification threshold value by using a character which has been incorrectly recognized or which has not been learned. This also uses the similarity degree $S_H$ in the same way as in Embodiment 2.

The image I/O device 6 supplies the binary mask pattern creation circuit 5 with data on the character category (assumed to be j-th category) to be updated. For the input image, the binary mask pattern creation circuit 5 updates the binary mask pattern for each of the character categories j=1, 2, ... J which are supplied from the normalization processing circuit 2 so as to be updated according to the following steps.

(Step 1b)

$K_j$ is assumed to be the number of the binary mask patterns of the j-th character category to be updated.

The similarity degree $S_H(X_t, M_{jk})$ is calculated between all the input image patterns $X_t$ and the binary mask pattern $M_{jk}$ (j=1, 2, ... J) (k=1, 2, ... $K_j$) of all the character categories so as to find $M_{lh}$ having the maximum similarity degree. It is assumed that the input image pattern $X_t$ belongs to the j-th character category.

If l≠j, a judgment is made that $X_t$ has been incorrectly recognized and a new label je is assigned.

Upon completion of this processing for all the character categories, control is passed to step 3b unless any input image pattern $X_t$ has been incorrectly recognized. Otherwise, control is passed to step 2b.

(Step 2b)

For each of the input image patterns $X_t$ for which the label je has been assigned, a temporary binary mask pattern $M_{je}$ is created in the same way as step 1a of the embodiment 2. Subsequently, the similarity degree $S_H(X_t, M_{je})$ is calculated between each of the $X_t$'s and the corresponding $M_{je}$'s so as to find the input image pattern $X_s$ having the maximum similarity degree. The binary mask pattern $M_{j(Kj+1)}$ to which the $X_s$ is to be added is stored in the binary mask pattern memory circuit 3. Assuming $K_j$=$K_j$+1, control is returned to step 1b.

(Step 3b)

The similarity degree $S_H(X_t, M_{jk})$ is calculated between each of the binary mask patterns $M_{jk}$ and each of input image patterns $X_t$ of categories, excluding the j-th character category, if any, so as to obtain the maximum similarity degree $t'_{jk}$ for each of the binary mask patterns $M_{jk}$. If all of these maximum similarity degrees exceed the identification threshold value $t_{jk}$ (if a new value is to be created, then $t_{jk}$=−n) stored in the binary mask pattern memory circuit 3, the threshold value $t_{jk}$ is updated to $t'_{jk}$ for the binary mask pattern $M_{jk}$ and the new value is stored in the binary mask pattern memory circuit 3. This processing is repeated for all the binary mask patterns.

In the above-described second and third embodiments, the similarity degree $S_H$ is used as the discriminant function. It is also possible to use the absolute value of the similarity degree $S_H$ as the discriminant function.

For creating a binary mask pattern, it is also possible to use known statistical inference (such as *Tookeigaku* (Statistics)" by T. Suzuki, Asakura Publishers, and "Pattern Classification and Sense Analysis" by R. O. Duda and P. E. Hart, John Wiley & Sons, Inc.).

In the above-described first embodiment, even if an image pattern is not contained in any character category, it is possible to create a binary mask pattern of a novel category by using the image pattern.

Furthermore, the present invention as has thus far been described, centering on characters, can also be implemented for general binary images such as diagrams.

Moreover, in the case of representative binary patterns such as printed kanji (Chinese characters), manuscript kanji, alphanumerics, symbols, formula expressions, and diagrams, it is possible to apply the character recognition method which is able to recognize images containing significant noise, character images having a striped design, and reverse contrast characters.

Furthermore, the present invention can also be applied for processing medical diagnosis check sheets, assuming disease categories as mask patterns.

For example, results of multiple diagnostic items are represented on the check sheet as binary image patterns as illustrated in FIG. 3. (For example, if the blood pressure is high or low, "1" or "0" is set, respectively. This can be replaced by "black" or "white" at a position corresponding to the item of the blood pressure.) The pattern obtained on the check sheet is supplied as a binary image pattern to be compared to a pre-stored binary mask pattern according to the disease name category, so as to recognize the disease name category. In this way, after the object to be recognized is converted into a binary image pattern, the pattern can be recognized in the same way as the above-described embodiments so as to determine the disease name category with enhanced efficiency.

What is claimed is:

1. An image pattern identification/recognition method, wherein an input binary image pattern is compared to each of binary ask patterns corresponding to each of pre-created recognition categories so as to determine the recognition category to which said binary image pattern belongs;

said method comprising an identification procedure for identifying said input binary image pattern as belonging to a first recognition category when black portions of said input binary image pattern are contained in black portions contained in a binary mask pattern of said first recognition category and when said black portions of said input binary image pattern are contained not only in those black portions which are contained both in said first recognition category and a second recognition category; and said method comprising a rejection procedure for rejecting said input binary image pattern when said input binary image pattern does not belong to any recognition category based on said identification procedure and when the black portions of said input binary image pattern correspond only to those black portions common to the binary mask pattern of said first recognition category and said second recognition category.

2. An image pattern identification/recognition method, wherein an input binary image pattern is compared to binary mask patterns corresponding to pre-created recognition categories so as to determine the recognition category to which said binary image pattern belongs;

said method comprising an identification procedure for identifying said input binary image pattern as belonging to a first recognition category when white portions of said input binary image pattern are contained in white portions contained in a binary mask pattern of said first recognition category and when said white portions of said input binary image pattern are contained not only in those white portions which are contained both in said first recognition category and a second recognition category; and said method wherein a rejection procedure is provided for rejecting said input binary image pattern when said input binary image pattern does not belong to any recognition categories based on said identification procedure and when the white portions of said input binary image pattern correspond only to those white portions colon to the binary mask pattern of said first recognition category and said second recognition category.

3. An image pattern identification/recognition method, wherein an input binary image pattern is compared to each of binary mask patterns corresponding to each of pre-created recognition categories so as to determine the recognition category to which said binary image pattern belongs; said image pattern identification/recognition method comprises:

obtaining a first match degree based on a total number of black pixels common to said binary image pattern and said binary mask pattern at a plurality of predetermined positions, obtaining a second match degree based on a total number of white pixels common to said binary image pattern and said binary mask pattern at said plurality of predetermined positions, obtaining a first mismatch degree based on a total number of combinations of white pixels of said binary image pattern and black pixels of said binary mask pattern at a plurality of predetermined positions, obtaining a second mismatch degree based on a total number of combinations of black pixels of said binary image pattern and white pixels of said binary mask pattern at a plurality of predetermined positions, obtaining a third match degree based on a product of said first match degree and said second match degree, obtaining a third mismatch degree based on a product of said first mismatch degree and said second mismatch degree, and obtaining a similarity degree between said binary image pattern and said binary mask pattern, based on said third match degree and said third mismatch degree; and recognizing that said binary image pattern belongs to the recognition category having the maximum of said similarity degree.

4. An image pattern identification/recognition method as claimed in claim 3, wherein said plurality of predetermined positions covers all the positions in said pattern.

5. An image pattern identification/recognition method, wherein an input binary image pattern is compared to each of binary mask patterns corresponding to each of pre-created recognition categories so as to determine the recognition category to which said binary image pattern belongs; said image pattern identification/recognition method comprises:

presetting a threshold value for each of said binary mask patterns of said recognition category;

obtaining a first match degree based on a total number of black pixels common to said binary image pattern and said binary mask pattern at a plurality of predetermined positions, obtaining a second match degree based on a total number of white pixels common to said binary image pattern and said binary mask pattern at said plurality of predetermined positions, obtaining a first mismatch degree based on a total number of combinations of white pixels of said binary image pattern and black pixels of said binary mask pattern at a plurality of predetermined positions, obtaining a second mismatch degree based on a total number of combinations of black pixels of said binary image pattern and white pixels of said binary mask pattern at a plurality of predetermined positions, obtaining a third match degree based on a product of said first match degree and said second match degree, obtaining a third mismatch degree based on a product of said first mismatch degree end said second mismatch degree, and obtaining a similarity degree between said binary image pattern and said binary mask pattern, based on said third match degree and said third mismatch degree; and identifying said binary image pattern as belonging to the recognition category when said similarity degree between said binary image pattern and the binary mask pattern of the corresponding recognition category exceeds the threshold value of said binary mask pattern only for a single recognition category.

* * * * *

UNITED STATES PATENT AND TRADEMARK OFFICE
CERTIFICATE OF CORRECTION

PATENT NO. : 5,600,736
DATED : February 04, 1997
INVENTOR(S) : Norihiro HAGITA et al.

It is certified that error appears in the above-identified patent and that said Letters Patent is hereby corrected as shown below:

Claim 1, column 13, line 43, "ask" should read --mask--.

Claim 2, column 14, line 19, "colon" should read --common--.

Claim 5, column 16, line 2, "end" should read --and--.

Signed and Sealed this

Fifteenth Day of September, 1998

Attest:

BRUCE LEHMAN

*Attesting Officer*  *Commissioner of Patents and Trademarks*